(12) United States Patent
Wang et al.

(10) Patent No.: US 7,174,547 B2
(45) Date of Patent: Feb. 6, 2007

(54) METHOD FOR UPDATING AND RESTORING OPERATING SOFTWARE IN AN ACTIVE REGION OF A NETWORK ELEMENT

(75) Inventors: Ruiping Wang, San Jose, CA (US); Peter Steele, San Jose, CA (US); Sundeep Mallya, Santa Clara, CA (US); Steve Langlois, Santa Clara, CA (US)

(73) Assignee: CIENA Corporation, Linthicum, MD (US)

( * ) Notice: Subject to any disclaimer, the term of this patent is extended or adjusted under 35 U.S.C. 154(b) by 631 days.

(21) Appl. No.: 10/106,169

(22) Filed: Mar. 25, 2002

(65) Prior Publication Data

US 2003/0182411 A1 Sep. 25, 2003

(51) Int. Cl.
G06F 9/44 (2006.01)
G06F 15/177 (2006.01)

(52) U.S. Cl. ............... 717/172; 717/169; 717/170; 709/221

(58) Field of Classification Search ................ 717/169, 717/170, 171–173; 709/221
See application file for complete search history.

(56) References Cited

U.S. PATENT DOCUMENTS 5,715,462 A    2/1998    Iwamoto et al.
5,764,989 A    6/1998    Gustafsson et al.
5,978,916 A    11/1999   Randall
6,070,012 A *  5/2000    Eitner et al. ................ 717/168
6,085,333 A *  7/2000    DeKoning et al. ............ 714/7
6,113,652 A *  9/2000    Lysik et al. ................. 717/170
6,154,878 A    11/2000   Saboff
6,199,203 B1   3/2001    Saboff
6,202,205 B1   3/2001    Saboff et al.
6,397,385 B1 * 5/2002    Kravitz ....................... 717/173
6,640,334 B1 * 10/2003   Rasmussen ................. 717/171
6,658,090 B1 * 12/2003   Harjunen et al. .......... 379/9.01

* cited by examiner

Primary Examiner—Tuan Dam
Assistant Examiner—Michael Yigdall
(74) Attorney, Agent, or Firm—Clements Walker; Christopher L. Bernard; Tyler S. Brown

(57) ABSTRACT

A method for replacing a current operating software with a new operating software in a working network environment during network operations while also preserving a backup for the replaced operating software. The method including active or non-active memories based on the operating software stored therein. The active and non-active memories being interchangeable to accommodate the new operating software without stopping operation of the network or active memory.

21 Claims, 7 Drawing Sheets

METHOD FOR UPDATING AND RESTORING OPERATING SOFTWARE IN AN ACTIVE REGION OF A NETWORK ELEMENT

FIELD OF THE INVENTION

The present invention relates generally to replacing or updating of operating software in an active region of a network element while the network element is active, running updated software as well as restoring the operating software such as in case of update malfunction.

BACKGROUND

As computer networks grow and expand it is important that all elements of the network operate in a coordinated fashion. One of the important steps in this process is to ensure that software on the various network elements is operated and updated in a coordinated manner. The problem of updating pre-existing, region-dependent software without affecting the region-dependent nature of the software and transporting the updated software to the destination (e.g., via the internet), extracting, loading and merging the updated software has been recognized, for example, by Randall in U.S. Pat. No. 5,978,916. This patent teaches a method, system and computer program for updating software with a common update module.

Certain networks require more than a coordinated software update. For example, communications networks have to operate with minimal downtime for administration and maintenance. When system files or operating software is being updated, the network element has to maintain full capability of transporting communication traffic and ensure minimum interruption in administration and maintenance capability. This is a difficult task, since operating software consists of files that are write-protected or access-locked to avoid accidental overwriting during routine operation.

In U.S. Pat. Nos. 6,199,203; 6,154,878 and 6,202,205 Saboff et al. teach memory management techniques for on-line replaceable software, e.g., a software library, such that the state of the software component is preserved after an update to the software component. This is accomplished by allocating two types of memory: transient memory and enduring memory (to be preserved between two calls of the library). In this method, when new version of the software is updated software from the transient memory is released, while the enduring memory is preserved for use by new software versions. In U.S. Pat. No. 5,764,989 Gustafsson et al. teach an interactive program or software development system which obviates the need to halt execution of a program under development or during a maintenance update to correct programming errors. Unfortunately, Saboff's technique is limited to the patching of memory and it cannot be applied to upgrade operating software in a communications network and Gustafsson's teaching cannot be extended to updates of operating systems with the above-mentioned interruption requirements in communications networks.

In fact, updating of system software in a network challenges the management of operating systems as well as operational continuity, memory management and data recovery. In U.S. Pat. No. 5,715,462 Iwamoto et al. present an updating and restoration method of system file that is designed for operating system (OS) updates and takes advantage of storing the same OS in separate memory areas. The executing OS in the first memory area is terminated and the OS in the second area is initiated. After the system files stored in the first area are released from access lock, substitute files provided in advance by using a file replacing function of the second OS replace them. When such as file replacement fails for some reason, the original operating system files are immediately restored.

Iwamoto's teaching moves a long way to solving the problem of upgrading or updating of operating system software and can be applied in communication networks. It offers safety in that it preserves files to provide for recovery and reinitiating of old operating software in case of failure. Unfortunately, Iwamoto's approach has several drawbacks. First, there is a lengthy period of loss of visibility to a network manager. This is the time involved in performing two terminations and activations or two reboot operations and new software installation. In a success scenario this time can be about 15 minutes, and close to one hour in a worst-case failure scenario. Second, this update method has poor failure handling capability with respect to detecting the condition of the system and reporting alarms. Since the application software cannot be started during the procedure, it is not possible to use the alarm mechanisms provided by the application software. Third, implementation and testing are complicated in this approach. The combinations of failure cases during the reboots can be dramatic and cause enormous increases in implementation and testing time.

Therefore, the problem of rapid, simple and effective operating system updates in networks with minimal loss of visibility to a network manager remains unsolved. This problem is especially acute in communications networks that have to maintain high visibility and error-free operation.

OBJECTS AND ADVANTAGES

In view of the above, it is an object of the present invention to provide a method for updating or replacing a current operating software and current files with new operating software and new files in an efficient, simple and rapid manner. Specifically, it is envisioned that the method provide for replacing the operating software and files with minimum loss of visibility to the network manager.

It is another object of the invention to ensure that the method for updating the system software sustains minimal loss of visibility even in case of worst-case failure scenarios.

It is yet another object of the invention to ensure that the implementation of the update method reduces failure cases during reboots by minimizing the number of reboots that need to be performed.

These and other objects and advantages will become apparent upon reading the detailed description.

SUMMARY OF THE INVENTION

The objects and advantages of the invention are achieved by a method for replacing a current operating software working with current files by a new operating software working with new files. Prior to replacement, the current operating software and current files reside in an active region of a network element, while the network element is active and maintains a prior operating software in a non-active region. In accordance with the method, the prior operating software is preserved in the non-active region and new operating software is downloaded to the non-active region. The new operating software is installed in the non-active region and the current files are saved. The current files are updated to create updated files conforming to the new operating software. The network element is then rebooted such that the active region and the non-active region are swapped, thereby replacing the current operating software working with the current files with the new operating software working with the updated files.

The method further includes the step of reinstalling in the non-active region the prior operating software that was preserved in the non-active region. A redistribution of the current files to the active region and prior files to the non-active region is also performed.

In a preferred embodiment the network element has a processing element module (PEM) and a persistent storage module (PSM) and the active region is partitioned or distributed between the PEM and PSM. The non-active region is also partitioned or distributed between the PEM and PSM. In this embodiment, the current files are saved in the active region of the PSM and in the active region of the PEM. Furthermore, when downloading the new operating software it is convenient to download load files of the new operating software into the non-active region of the PSM and PEM.

The prior operating software has prior files, which typically include a database. The step of preserving the prior operating software includes storing the load files of the prior operating software in the non-active region in the PSM. The prior files are also preserved in the non-active region in the PEM. The prior operating software is erased during installation of the new OS files.

Because of space, it is also preferable to download the new operating software by downloading load files of the new operating software into the non-active regions defined in the PSM. Installation of the new operating software is then accomplished through extracting and installing the load files to build the new operating software. The new operating software is installed in the non-active region of the PSM and PEM.

In one embodiment, the current files are stored in the active region. For example, the current files can be stored in the active region of the PSM and PEM. Thus, after the reboot, these files will be located in the non-active region of the PSM and PEM. These current files typically include a database.

The method of the invention can be used to upgrade or update operating systems in network elements belonging, e.g., to a communication network. In one embodiment, the new operating software is a software release of the current operating software. Of course, the new operating software can also be a maintenance version or any other modified version of the current operating software.

When the new operating system malfunctions or if the network administrator wishes to revert to the current operating software for any reason, the current operating software can be restored. The step of restoring involves rebooting the network element such that the active region and non-active region are swapped again, provided the swap reboot was successful. This replaces the new operating software working with updated files by the current operating software working with the current files.

The invention also includes a storage medium that performs the above-enumerated steps of replacing the current operating software working with current files by the new operating software working with updated files. Specifics and details about the method of invention and the steps stored in the storage medium are found in the following detailed description with reference to the attached drawing figures.

DETAILED DESCRIPTION

Figure 1:
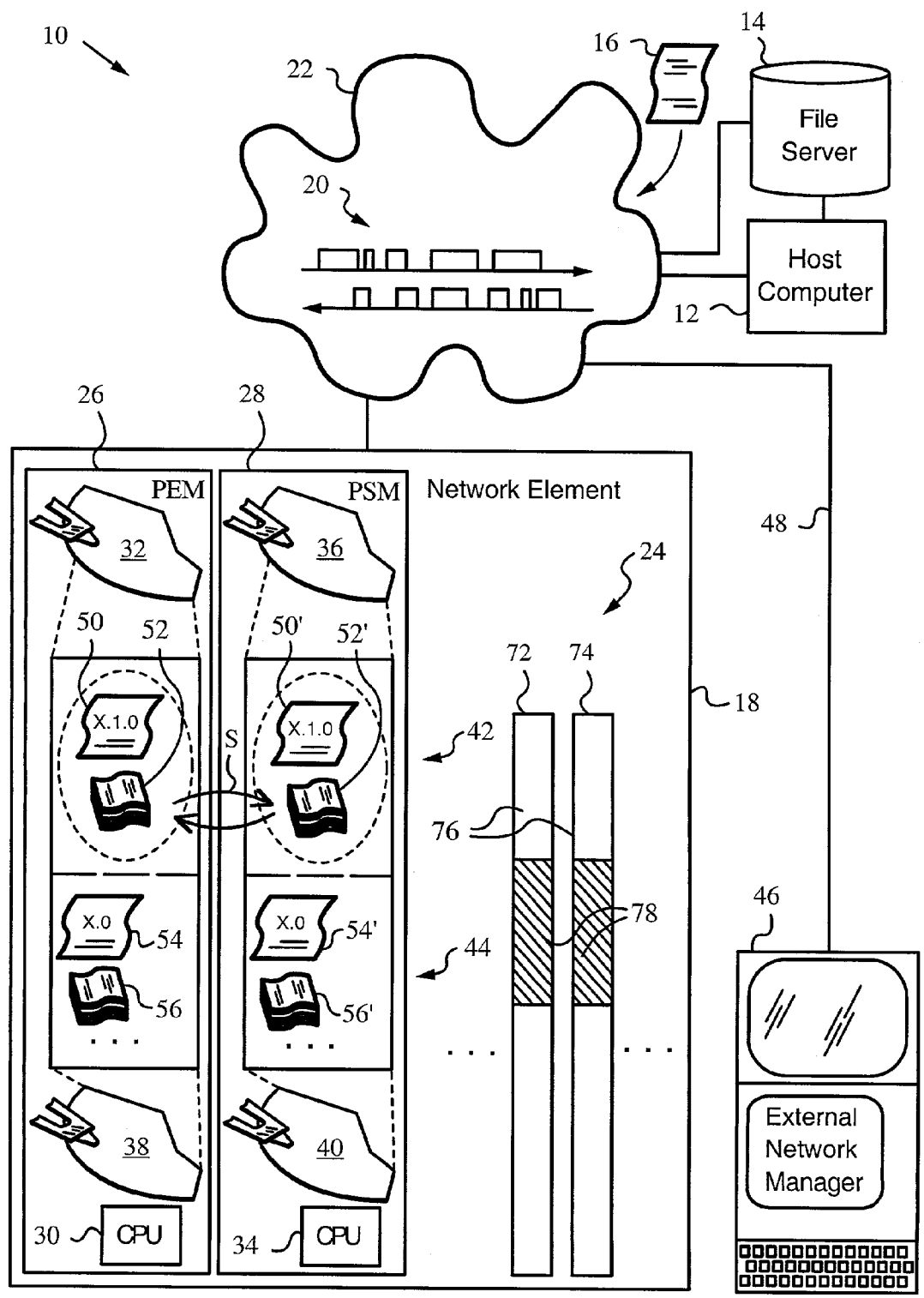
FIG. 1 is a schematic diagram of a communication network in which the method of the invention is applied.

The method of invention will be best understood by first examining a communication network 10 of FIG. 1, in which the method is applied. It will be clear to a person skilled in the art that communication network 10 is an exemplary network, e.g., the internet, and that other networks and computer systems exhibiting different network architectures can take advantage of the method.

Communication network 10 has a host computer 12 and a file server 14. Host computer 12 is, for example, a data base machine that supervises the operation of network 10. Thus, host computer 12 oversees the transmission and reception of data 20 within network 10. Host computer 12 also manages file server 14 to which files can be stored and from which files, such as files 16, may be sent to any given network element, such as network element 18, belonging to network 10.

Network 10 has various resources including data transmission lines (e.g., optical fibers), repeater stations, routers, filters and the like. These resources transmit and distribute data 20 throughout network 10 and are generally indicated by reference 22. A person skilled in the art will appreciate that any specific type of network will be provisioned with appropriate resources 22.

Network element 18 is connected to network 10 such that it can send and receive data 20. Network element 18 includes a number of circuits, data processing devices and modules 24. The modules include a processing element module (PEM) 26 and a persistent storage module (PSM) 28. PEM 26 has a central processing unit 30, a first storage unit 32 and a second storage unit 38. In this embodiment both storage units 32, 38 are hard disk drives, but a person skilled in the art will recognize that any other suitable storage units affording sufficiently rapid access times for processing functions which PEM 26 is to perform in managing the communications of network element 18 can be employed. PSM 28 is equipped with its own central processing unit 34 and its own storage units 36, 40 which are also hard disk drives in this embodiment. PSM 28 is designed to provide redundant storage to PEM 26, in case of failure.

Hard drive 32 is selected as the active drive of PEM 26 and hard drive 38 as the non-active drive. In PSM 28 hard drive 36 is chosen as the active drive and hard drive 40 as the non-active drive. An active region 42 is defined on drives 32, 36 in PEM 26 and PSM 28. A non-active region 44 is defined on drives 38, 40 in PEM 26 and PSM 28. Active and passive regions 42, 44 are thus partitioned or distributed among hard drives 32, 36 and 38, 40 and the division between passive and active regions 42, 44 is indicated by a dashed line. The software and files in active region 42 are access-locked or write-protected to prevent accidental overwriting during routine operation of network element 18.

An external network manager 46 has access to network element 18 via interface 48. External network manager 46 monitors the operation of network element 18 and requires that the operations being performed by network element 18 be visible. Network manager 46 requires maximum visibility, preferably at all times, of the operation being performed by network element 18 to ensure that administrative and maintenance functions can be performed.

Active region 42 in PEM 26 and PSM 28 is synchronized by appropriately controlling drives 32, 36 as indicated by arrows S. Such synchronization is well understood by those skilled in the art. Meanwhile, non-active region 44 in PEM 26 and PSM 28 is not synchronized. Non-active region 44 in PEM 26 and PSM 28 is not write-protected and serves to store files. In fact, active region 42 in PEM 26 stores a current operating software (OS) 50 and current files 52. OS 50 works with current files 52, which typically include a database, to coordinate the operation of network element 18. A copy of current OS 50' and of current files 52' is also installed and maintained in synch in active region 42 of PSM 28. Non-active region 44 on both PEM 26 and PSM 28 contains a prior OS 54, 54' and prior files 56, 56' respectively. Additional files can also be stored in non-active region 44, especially in PSM 28. For that reason, it is preferable that the capacity of hard drive 40 be large enough to accommodate numerous software files over and above prior OS 54' and prior files 56'.

Modules 24 also include transport cards, of which only two cards 72, 74 are shown for simplicity. Transport cards 72, 74 are typically circuit packs placed on the shelves of network element 18 alongside PEM 26 and PSM 28, but in different slots. Cards 72, 74 perform all data traffic processing functions, including amplifying, multiplexing/demultiplexing, wavelength conversion and other functions required to process and route data 20. To perform these functions, transport cards 72, 74 run corresponding applications. Thus, when active, transport cards 72, 74 carry a software load including an application, a boot loader, a microboot loader and any other necessary software (e.g., field-programmable gate array (FPGA) assignments), as is known to those skilled in the art. Preferably, the software on transport cards 72, 74 is stored in an active flash memory region 76 and a non-active flash memory region 78 on each transport card 72, 74. Both the active and non-active regions carry the exact same software loads for redundancy.

During normal operation current OS 50 in conjunction with current files 52 operates network element 18 and uses non-active region 44 on drives 38, 40 for backing up and storing files. Synchronized current OS 50' and current files 52' also in active region 42 can be used to recover PEM 26 after a failure, e.g., in case of drive 32 malfunction. It should be noted that in a typical network element 18, PSM 28 cannot use current OS 50' and current files 52' to operate network element 18 in case of failure of PEM 26.

If it is desired that network element 18 operate with prior OS 54, a reboot procedure is performed. During reboot OS 54, 54' with files 56, 56' are re-activated by swapping active region 42 and passive region 44. Rebooting drives 32, 36, 38, and 40 in accordance with standard procedures is known in the art. The actual flow of data 20 is processed and routed by transport cards 72, 74 under the direction of software executing from active region 76 of their flash memories. In case of failure or malfunction of transport cards 72, 74 the software in non-active flash memory region 78 is activated and used to direct the traffic of data 20.

Periodically, a new release, maintenance update or otherwise new, patched, modified or upgraded OS is to be installed on network element 18. Such new OS can be distributed from file server 14 on instructions from host computer 12 and delivered in the form of load files 16 to network element 18. Alternatively, the new OS can be provided through network administrator 46 or by otherwise loading new OS via a local interface from an external device, e.g., an external removable disk drive.

It is important that the replacement of current OS 50, 50' working with current files 52, 52' by new OS working with new files be performed in a manner which minimizes loss of visibility to network manager 46, minimizes probability of malfunctions and uses the least reboot operations possible. The present method provides for such replacement, as will now be explained in reference to FIGS. 2A–I.

Figure 2A:
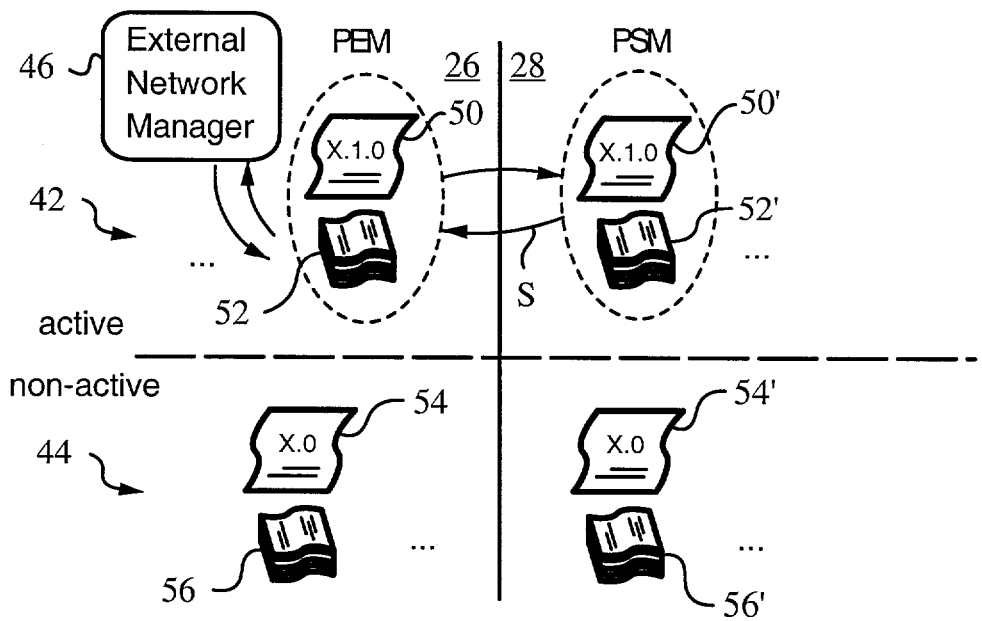
FIGS. 2A–I are diagrams illustrating the steps of the method.

FIG. 2A illustrates the condition of active region 42 and non-active region 44 on PEM 26 and PSM 28 prior to any updating activity. During this time, network manager 46 is able to monitor and maintain the operation of network element 18. Current OS 50, in the present embodiment OS version X.1.0, and current files 52 installed in active region 42 of PEM 26 are controlling the operation of network element 18. Since OS X.1.0 50 and current files 52 on PEM 26 are synchronized with OS X.1.0 50' and current files 52' on PSM 28, OS X.1.0 50' and current files 52' can be used to recover PEM 26 in case of a malfunction.

Non-active region 44 on both PEM 26 and PSM 28 contains prior OS 54, 54', in this case X.0 and prior files 56, 56' respectively. Thus, it is also possible to reboot PEM 26 and PSM 28 such that prior OS 54, 54' and prior files 56, 56' are in active region 42 and current OS 50, 50' along with current files 52, 52' are in non-active region 44. This process can be used to revert to prior OS 54, 54' for any desired reason. The process involves rebooting PEM 26 and PSM 28 and placing drives 38 and 40 in active region 42 while assigning drives 32, 36 to non-active region 44 (see FIG. 1).

The state illustrated by FIG. 2A with current OS X.1.0 50, 50' and prior OS X.0 54, 54' stored in active and non-active regions 42, 44 of PEM 26 and PSM 28 is frequently referred to as the activated state. The rebooting procedure is also referred to as a swap reboot and is familiar to those skilled in the art.

Figure 2B:
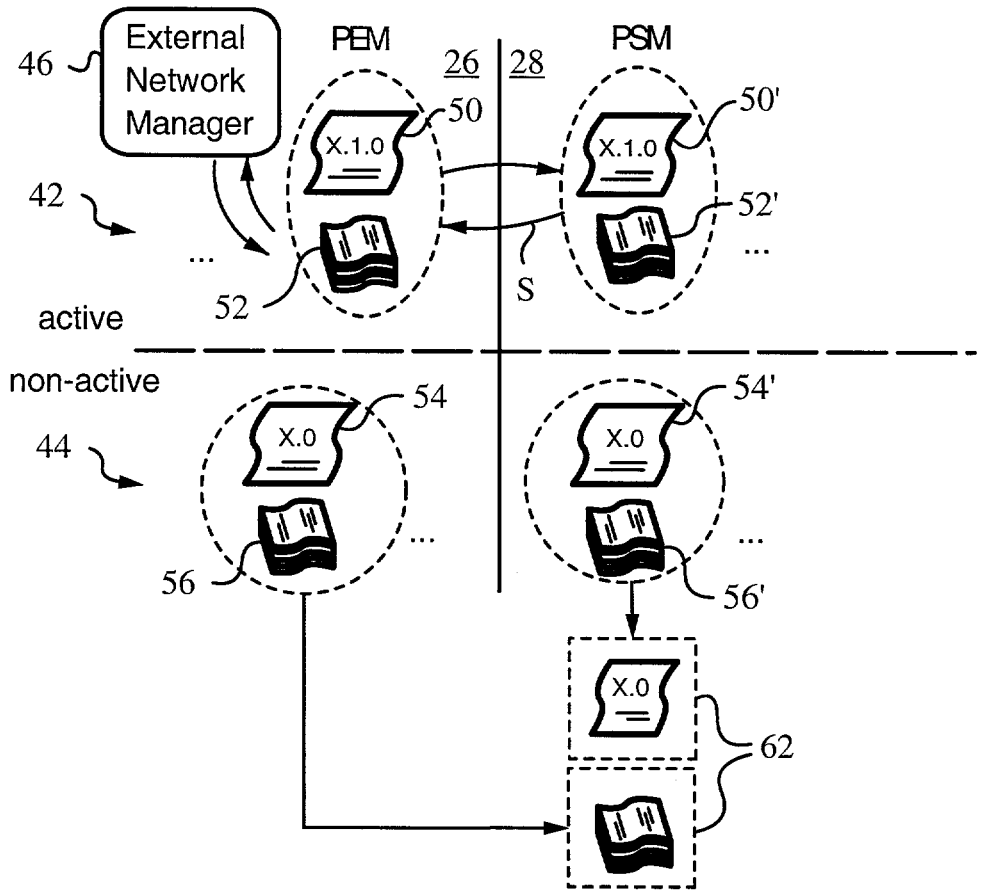

FIG. 2B illustrates the first step taken in replacing current OS X.1.0 50, 50' working with current files 52, 52' by new OS and new files when network element 18 is in the activated state shown in FIG. 2A. Specifically, before the replacement, prior OS X.0 54, 54' and prior files 56, 56' are preserved in non-active region 44. Preferably, the preservation involves saving load files 62 of prior OS X.0 54 and of prior files 56 where sufficient storage space is available. Conveniently, this space is provided in non-active region 44 of PSM 28. Prior OS X.0 54 will be erased after load files 62 of prior OS X.0 54 are stored and during installation of new OS files. Alternatively, if drives 38, 40 have sufficient storage capacity, prior OS X.0 54, 54' and prior files 56, 56' can be retained in non-active region 44 of PEM 26 and PSM 28.

Figure 2C:
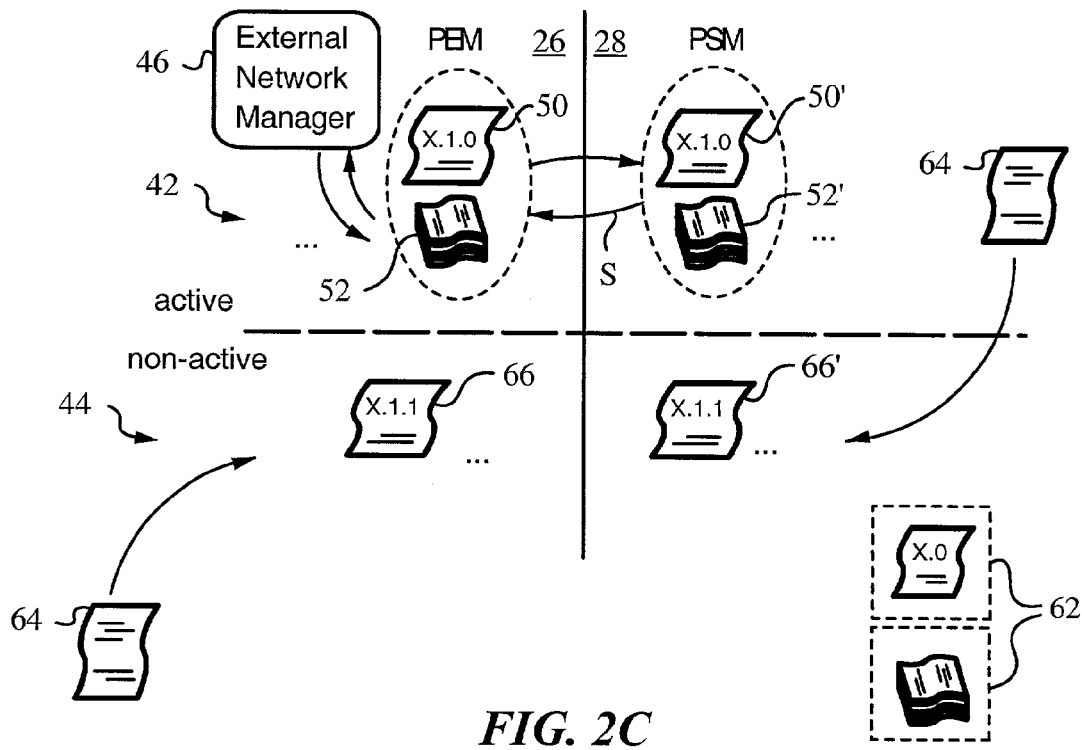

FIG. 2C illustrates the next step, during which load files 64 of new OS X.1.1 66 are downloaded to non-active region 44 of PEM 26 and PSM 28. Alternatively, load files 64 can be downloaded only to non-active region 44 of PSM 28 and from there be installed in non-active region 44 of PEM 26. This approach is preferable, as it conserves disk space.

Load files 64 can be delivered through network 22, i.e., they can be embedded in files 16 sent from file server 14 upon authorization of host computer 12. Alternatively, load files 64 can be supplied locally. For example, network element 18 may be equipped with a drive for reading removable media such as a CD drive (not shown) and load files 64 can be provided on a readable storage medium such as a CD. In still another approach, a personal computer (PC) can be connected to network element 18 via a craft interface port to download load files 64. A person skilled in the art will recognize that there are numerous ways in which load files 64 can be delivered to network element 18.

New OS X.1.1 66 is installed in non-active region 44 of PEM 26. In addition, a redundant copy of new OS X.1.1 66' is installed in non-active region 44 of PSM 28. The installation involves extracting load files 64 installing the extracted files and building new OS X.1.1 66 and new files 68 on PEM 26 and respective copies of OS X.1.1 and of new files 66', 68' on PSM 28. During this process prior OS X.0 54, 54' and prior files 56, 56' are overwritten. In other words, prior OS X.0 54, 54' as well as prior files 56, 56' are erased when new OS X.1.1 66, 66' and new files 68, 68' are installed. It should be noted that throughout this process the operation of network element 18 is visible to network manager 46.

Figure 2D:
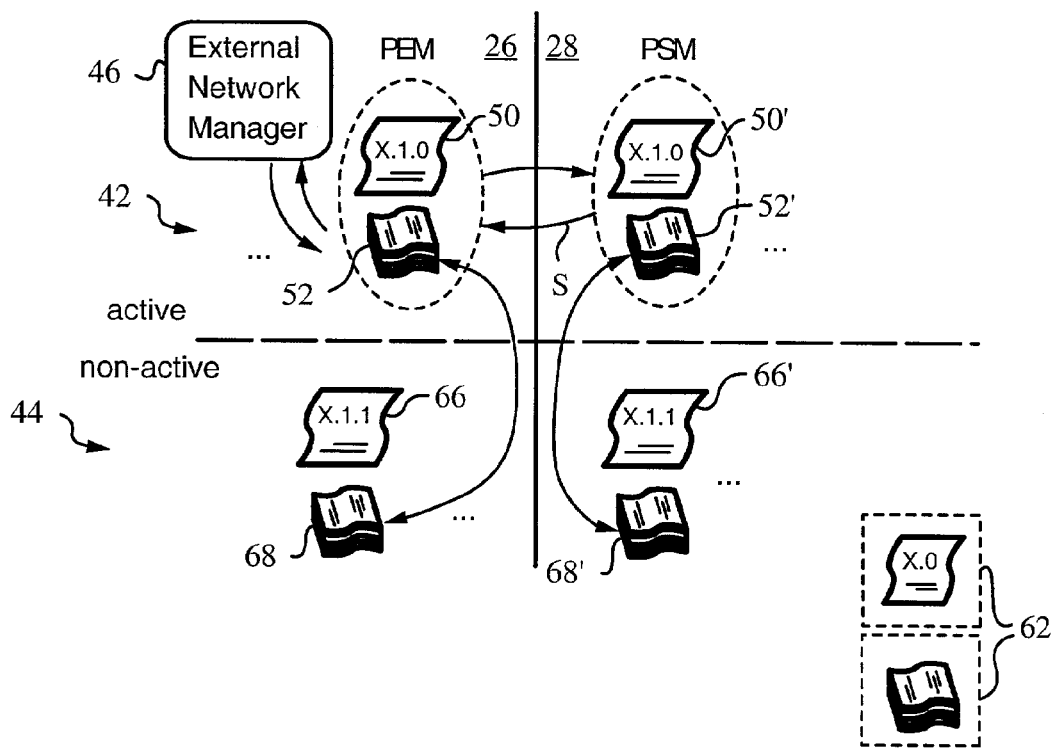

In the next step shown in FIG. 2D new files 68, 68' are updated with the information being used by current files 52, 52'. Current files 52, 52' typically contain a database and other files that are formatted to cooperate with current OS X.1.0 50, 50'. It is important that the contents of this database and of the other files be transmitted to new files 68, 68' so that new OS X.1.1 66 can pick up the work seamlessly from current OS X.1.0 50. This can be done in any suitable manner known to those skilled in the art. For example, the data from the database and any other files belonging to current files 52, 52' can be imported into new files 68, 68' directly. Alternatively, the database and files can be converted or reformatted to conform to the standards of files 68, 68' and merged. In any case, this step should be performed just prior to the subsequent steps to ensure that new OS 66, 66' can start operating with new files 68, 68' containing up-to-date information.

Figure 2E:
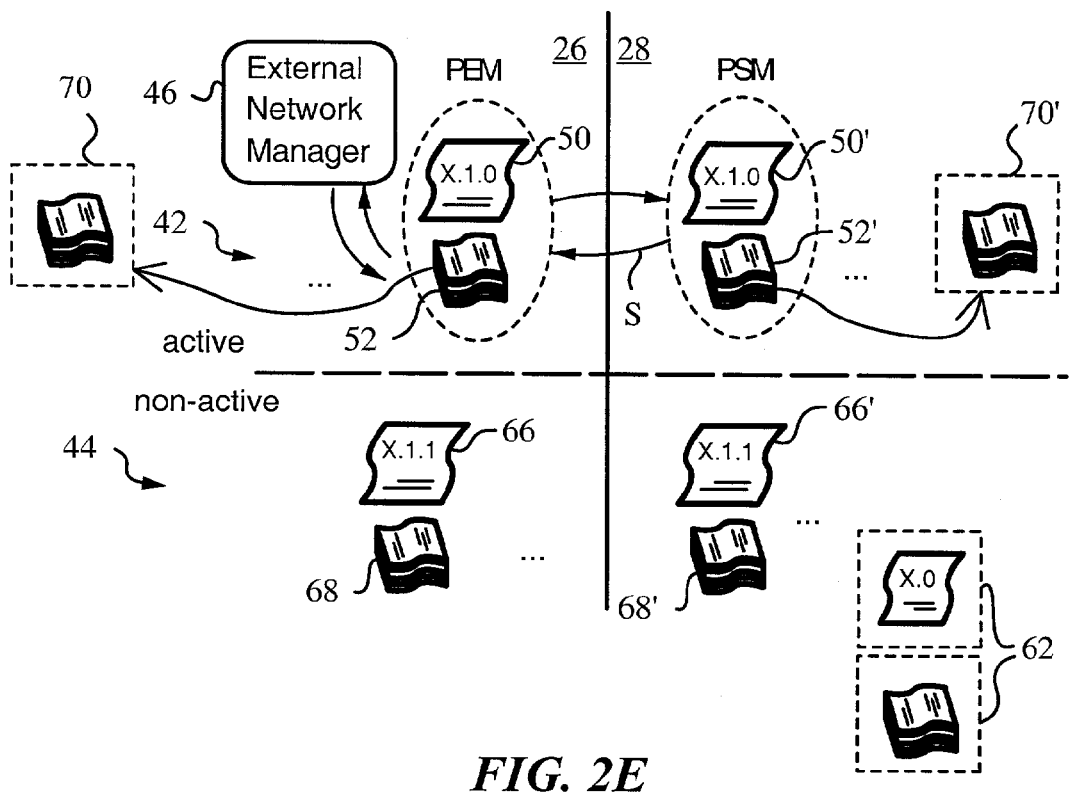

In the subsequent step, illustrated in FIG. 2E copies of current files 52, 52' are saved as backup files 70, 70' on PEM 26 and PSM 28 respectively. Backup files 70, 70' are kept in active region 42 of PEM 26 and PSM 28. It should be noted that up until the step of FIG. 2E, network manager 46 can monitor the activity of PEM 26 and PSM 28.

Figure 2F:
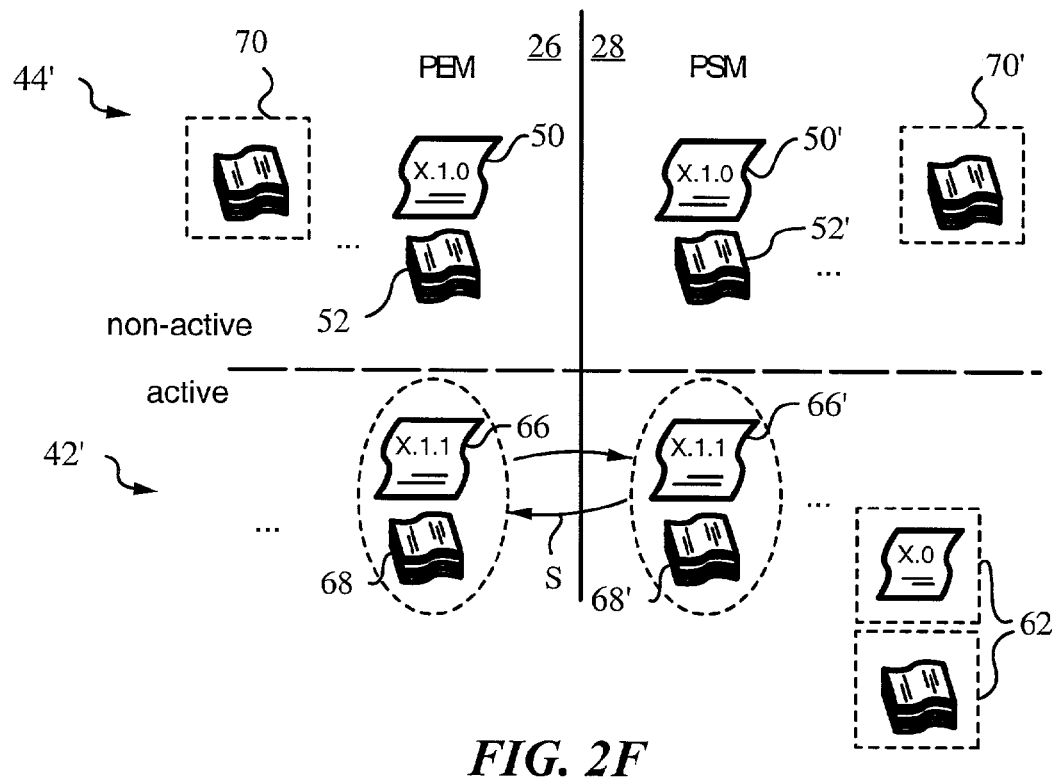

During the next step, network element 18 is rebooted. This procedure is illustrated in FIG. 2F and it involves restarting both PEM 26 and PSM 28 and re-assigning drives 32, 36, 38, and 40. During the restarting procedure active and non-active regions 42, 44 are redistributed or repartitioned. In particular, drives 32, 36 are designated as non-active while drives 38, 40 are selected as active. Thus, the rebooting operation swaps the active and non-active regions 42, 44. Formerly non-active region 44 of PEM 26 and PSM 28 is now active region 42' while formerly active region 42 of PEM 26 and PSM 28 becomes non-active region 44'. The appropriate rebooting procedures are well known to those skilled in the art.

As a result of the reboot, current OS X.1.0 50, 50' working with current files 52, 52' are in non-active region 44'. Meanwhile, new OS X.1.1 66, 66' working with new files 68, 68' are in active region 42'. Thus, the reboot replaces current OS X.1.0 with new OS X.1.1 in active region 42'. Meanwhile, backup files 70, 70' of current files 52, 52' are in non-active region 44 of PEM 26 and PSM 28 respectively. During the rebooting operation network element 18 is not visible to network manager 46.

Figure 2G:
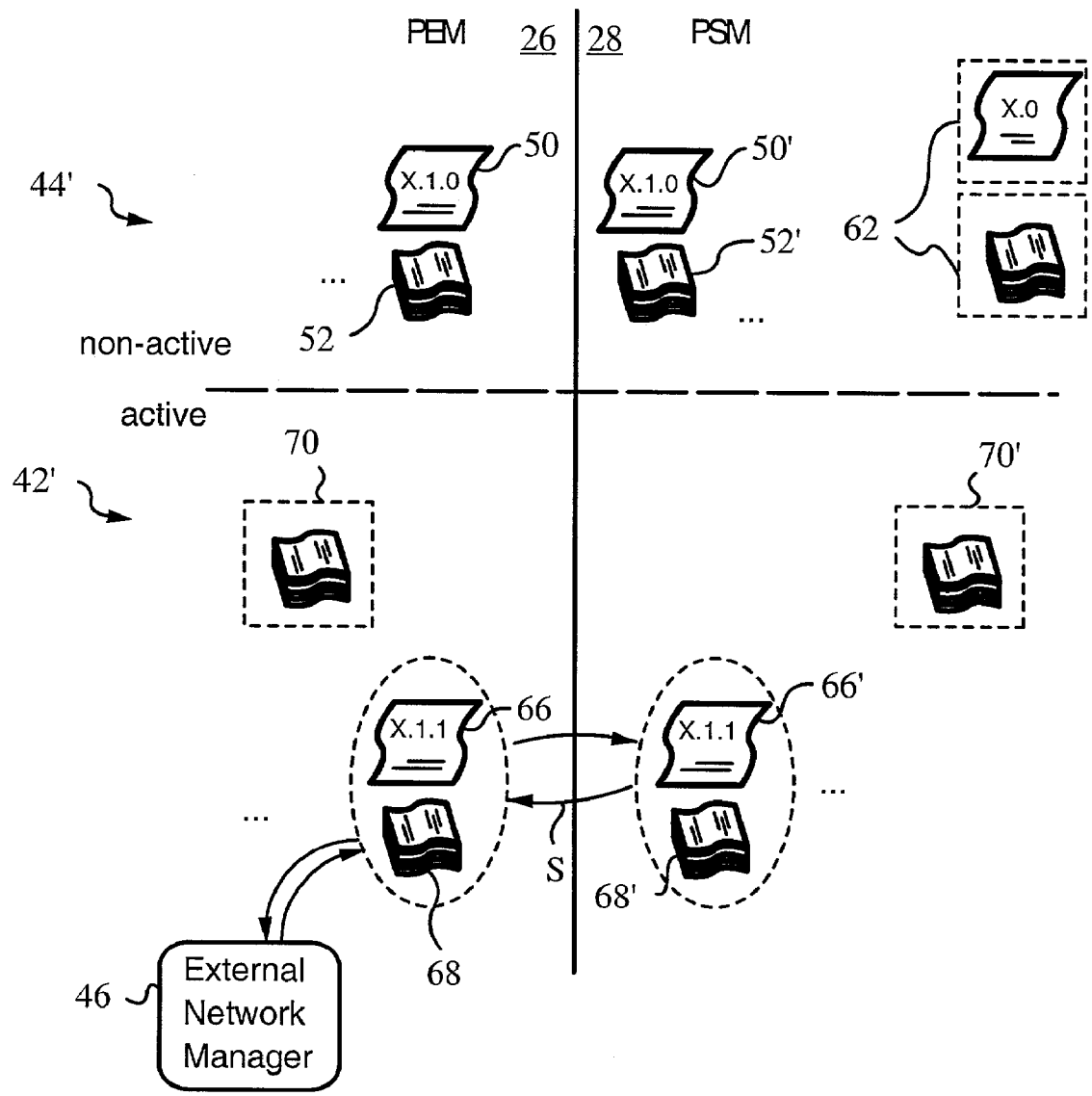

After the reboot new OS X.1.1 66, 66' and new files 68, 68' are placed into operation and synchronized, as shown in FIG. 2G. At this time network element 18 starts running under the direction of new OS X.1.1 and communication with network element 18 is re-established. At this point, active region 42' is fully functional and network manager 46 can once again monitor the activity of network element 18. In other words, visibility of network element 18 is restored at this time.

To complete the process backup files 70, 70' and load files 62 stored in active and non-active regions 42', 44' are redistributed. In particular, backup files 70, 70' are moved to active region 42' on PEM 26 and PSM 28 respectively. Additionally, load files 62 of prior OS X.0 54, 54' and prior files 56, 56' are moved to non-active region 44' on PSM 28.

Figure 2H:
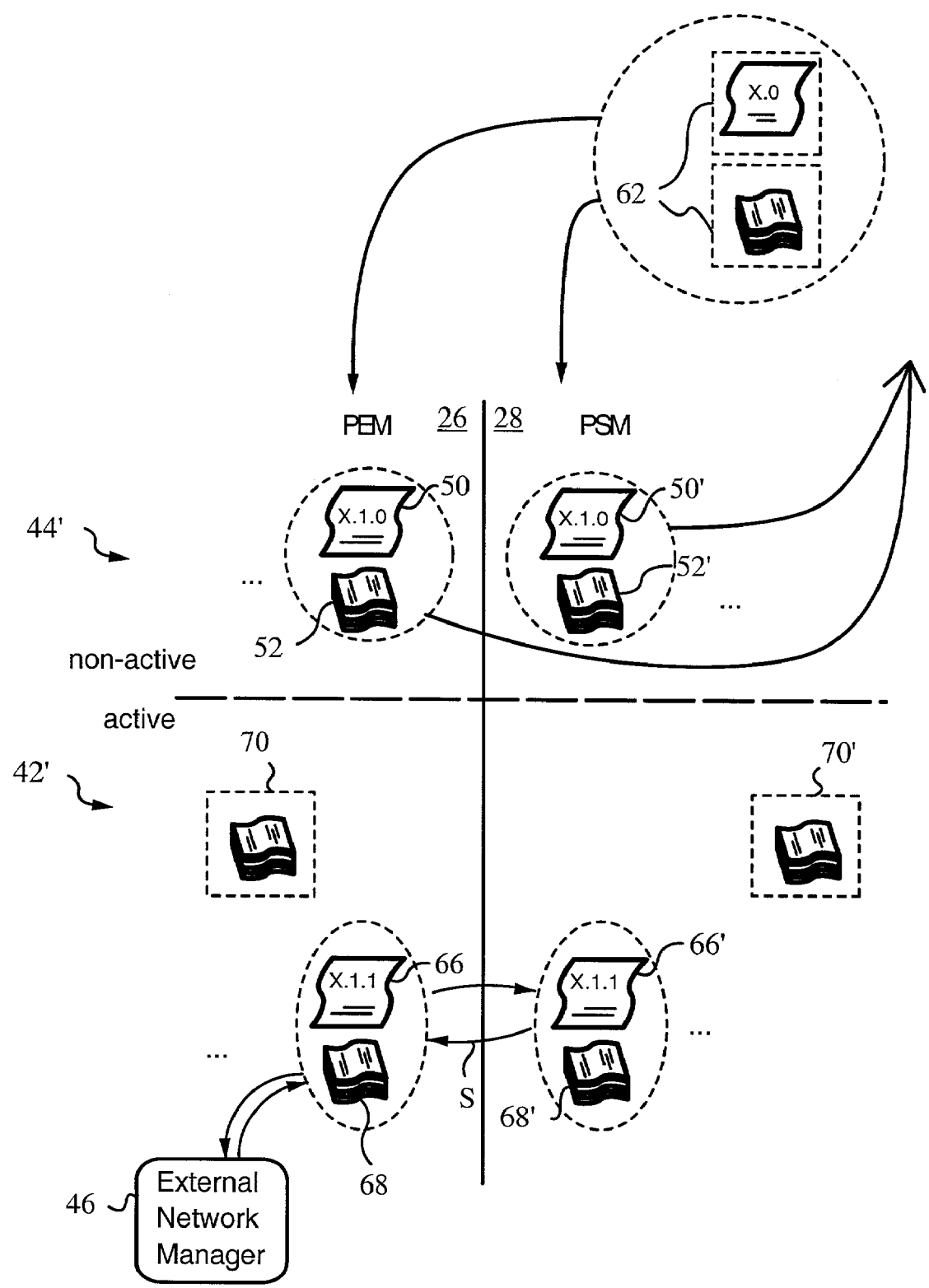

FIG. 2H illustrates a clean-up step performed after successful installation of new OS X.1.1 66, 66' and new files 68, 68'. The clean up involves removing current OS X.1.0 50, 50' and current files 52, 52' from non-active region 44'. This is done by overwriting prior OS X.0 54, 54' and prior files 56, 56' in non-active region 44' on PEM 26 and PSM 28 respectively. This is done in cases where network manager 46 wishes that upon reboot prior OS X.0 54, 54' rather than current OS X.1.0 50, 50' operate network element 18. Such reboot can be performed if desired by the network manager 46 or for any other reason. Before the reboot, prior files 56, and the database of prior files 56 in particular, can be updated with the data from new files 68 if possible.

If sufficient space is available, current OS X.1.0 50, 50' or its load files can be stored for eventual future use. Also, back-up files 70 of current files 52, 52' containing the database can be stored to a suitable storage device (not shown) in network element 18.

Figure 2I:
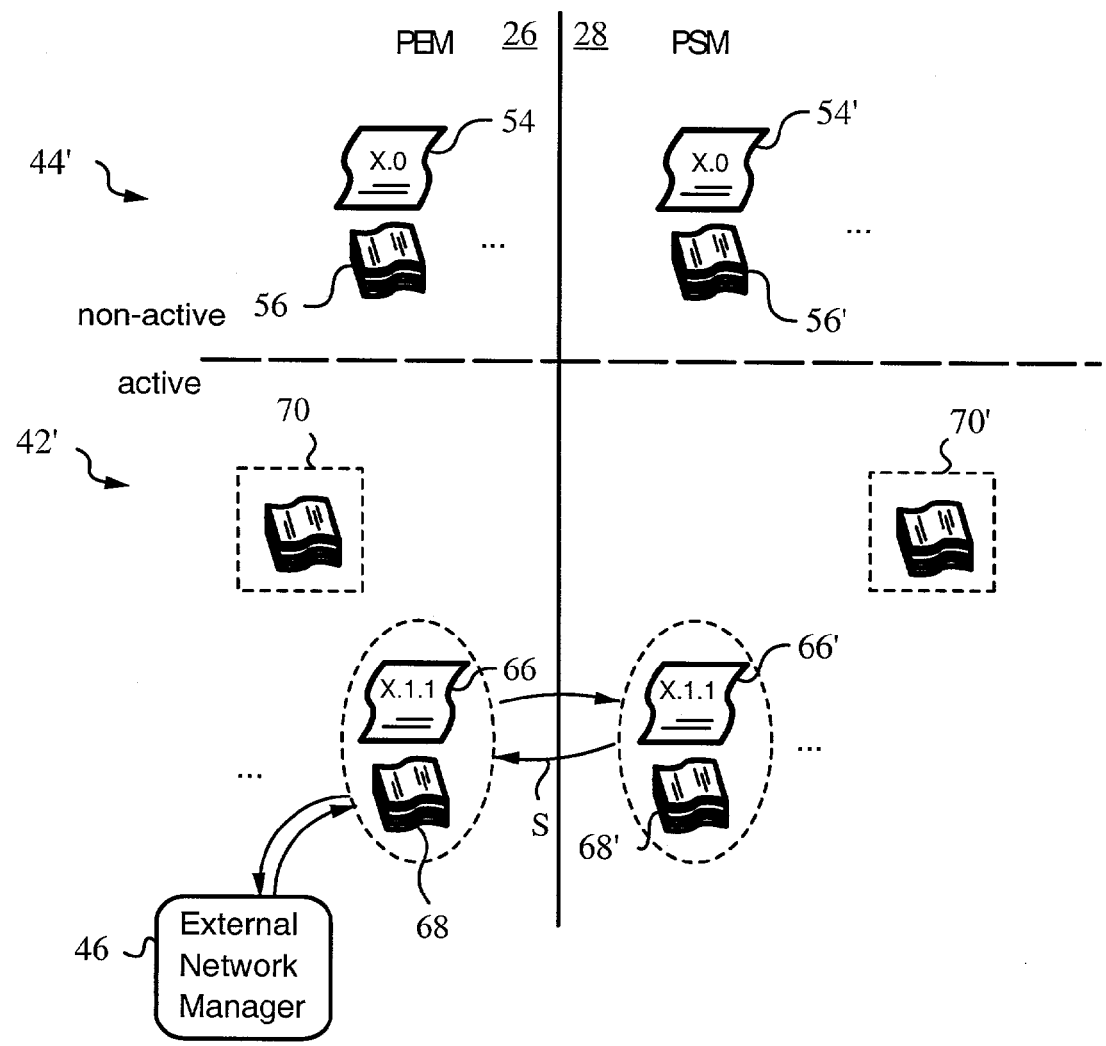

FIG. 2I illustrates the result of the process. Network element 18 is once again in the activated state and is committed to operating with new OS X.1.1 66, 66' and new files 68, 68'.

It should be noted that new OS X.1.1 66, 66' and new files 68, 68' can be aborted upon instructions from network element 18. In this case, prior software 54, 54' and prior files 56, 56' are re-activated by another reboot and swap of the active and non-active regions 42', 44' to revert to the previous configuration.

The method of the invention can be used to upgrade or update OS software and files in network elements belonging to a communication network and operating on live data or in other networks. The method limits the loss of visibility of network element 18 because only one reboot is necessary to switch network element 18 to the new OS, after which network element 18 continues working seamlessly with actual data. During other stages of the OS replacement, even in case of most of the failure recovery scenarios, network manager 46 has visibility of the operations being executed on network element 18.

Implementation and testing is straightforward because the failure path in failed upgrades is conceptually, the exact reverse of the success path. Furthermore, failures in any recovery activities performed in the non-active region will not cause the entire method to fail. This is because OS in the current region is already updated successfully and running when the final operations in the non-active regions are being performed. In fact, the problems in the non-active region can be supplied with appropriate alarms and fixed during separate steps. Such alarms and steps are well known to those skilled in the art.

The method of invention can be used in any networks. It fact, it is advantageous to also use this method for updating a current card OS with a new card OS in transport cards 72, 74 of network element 18. Preferably, at this time, new OS X.1.1 66, 66' and new files 68, 68' are already downloaded and installed in non-active region 44 of PEM 26 and PSM 28.

The process of updating transport cards 72, 74 is performed by following the steps shown in FIGS. 2A–E and operating on active and non-active flash memory regions 76, 78. Thus new card OS and accompanying new card files which are to replace current card OS and current card files are loaded. After PEM 26 and PSM 28 are successfully rebooted and active and non-active regions 42, 44 are swapped to active and non-active regions 42', 44' the update of transport cards 72, 74 is resumed by following the steps illustrated in FIGS. 2F–I. During these steps, non-active flash memory region 78 becomes the active flash memory region and is committed with new card OS and new card files. Failure in delivering new OS or files, or failure in completing restart during the reboot and swap of active and non-active flash memory regions 76, 78 is considered as failure of the entire process. In other words, the upgrade of network element 18 is considered a failure and reboot to revert back to current OS and current files is performed on PEM 26, PSM 28 as well as on transport cards 72, 74.

The method of invention can be used in many types of networks and at various levels. As illustrated in the above embodiment, the method can even be performed to update various components of the same network. In another embodiment, the steps of the method are stored in a storage medium. The method can thus be loaded into any suitable processor on a network requiring OS replacement and executed. A person skilled in the art will recognize that many extensions and alternative embodiments of the invention are possible and that the full breadth of the invention is hence defined by the scope of the appended claims and their legal equivalents.

We claim:

1. A method for replacing a current operating software working with current files in a network element comprising a processing element module and a persistent storage module, each having an active region and a non-active region, said current operating software and said current files residing in said active region of said processing element module and said persistent storage module while said processing element module and said persistent storage module are active and wherein said non-active region of said processing element module and said non-active region of said persistent storage module maintain a prior operating software, said method comprising:

preserving said prior operating software in said non-active region of said processing element module and in said non-active region of said persistent storage module;

downloading a new operating software to said non-active region of said persistent storage module;

installing said new operating software in said non-active region of said processing element module and in said non-active region of said persistent storage module;

saving said current files;

updating said current files to create updated files conforming with said new operating software; and rebooting said network element such that said active region and said non-active region of said processing element module are swapped, and said active region and said non-active region of said persistent storage module are swapped, thereby replacing said current operating software working with said current files with said new operating software working with said updated files;

wherein said network element concurrently utilizes the current operating software and current files residing in said active region of said processing element module during said downloading to said non-active region of said persistent storage module and installing of said new operating software in said non-active region of said processing element module and in said non-active region of said persistent storage module;

wherein the processing element module comprises a first central processing unit, a first physical storage unit for the active region, and a second physical storage unit for the non-active region, and the persistent storage module comprises a second central processing unit, a third physical storage unit for the active region, and a fourth physical storage unit for the non-active region; and wherein the active region of the processing element module and the active region of the persistent storage module are synchronized and access-locked, and the non-active region of the processing element module and the non-active region of the persistent storage module are not synchronized and not access-locked.

2. The method of claim 1, further comprising reinstalling in said non-active region of said processing element module and in said non-active region of said persistent storage module after rebooting said prior operating software preserved in said non-active region.

3. The method of claim 1, further comprising redistributing said current files to said active region of said processing element module and in said active region of said persistent storage module and said prior files to said non-active region of said processing element module and in said non-active region of said persistent storage module.

4. The method of claim 1, wherein said step of saving comprises saving said current files in said active region of said persistent storage module.

5. The method of claim 4, wherein said step of saving further comprises saving said current files in said active region of said processing element module.

6. The method of claim 1, wherein said step of downloading comprises downloading load files of said new operating software into said non-active region of said processing element module.

7. The method of claim 1, wherein prior operating software has prior files and said step of preserving said prior operating software comprises storing load files of said prior operating software in said non-active region of said persistent storage module.

8. The method of claim 7, further comprising preserving said prior files in said non-active region of said persistent storage module.

9. The method of claim 7, further comprising erasing said prior operating software.

10. The method of claim 1, wherein said step of downloading said new operating software comprises downloading load files of said new operating software into said non-active region of said persistent storage module.

11. The method of claim 1, wherein said step of installing said new operating software comprises installing said new operating software in said non-active region of said persistent storage module and in said non-active region of said processing element module.

12. The method of claim 1, wherein said step of saving said current files comprises saving said current files in said active region of said persistent storage module and in said non-active region of said processing element module.

13. The method of claim 1, wherein said current files comprise a database.

14. The method of claim 1, wherein said step of downloading comprises downloading load files of said new operating software and extracting said load files to build said new operating software.

15. The method of claim 1, wherein said new operating software comprises a software release of said current operating software.

16. The method of claim 1, wherein preserving said prior operating software comprises storing load files of said prior operating software.

17. The method of claim 1, further comprising restoring said current operating software.

18. The method of claim 17, wherein said step of restoring comprises rebooting said network element such that said active region and said non-active region of said processing element module are swapped, and said active region and said non-active region of said persistent storage module are swapped, thereby replacing said new operating software working with said updated files with said current software working with said current files.

19. The method of claim 17, wherein said step of restoring is performed upon a malfunction.

20. The method of claim 1, wherein said network element further comprises transport cards having an active flash memory region and a non-active flash memory region, and a swap reboot is performed in said active flash memory region and said non-active flash memory region to replace a current card operating software with a new card operating software.

21. A storage medium tangibly embodying the steps for replacing a current operating software working with current files in a network element comprising a processing element module and a persistent storage module, each having an active region and a non-active region, said current operating software and said current files residing in said active region of said processing element module and said persistent storage module while said processing element module and said persistent storage module are active and wherein said non-active region of said processing element module and said non-active region of said persistent storage module maintain a prior operating software, said steps comprising:

preserving said prior operating software in said non-active region of said processing element module and in said non-active region of said persistent storage module;

downloading a new operating software to said non-active region of said persistent storage module;

installing said new operating software in said non-active region of said processing element module and in said non-active region of said persistent storage module;

saving said current files;

updating said current files to create updated files conforming with said new operating software; and rebooting with said network element such that said active region and said non-active region of said processing element module are swapped, and said active region and said non-active region of said persistent storage module are swapped, thereby replacing said current operating software working with said current files with said new operating software working with said updated files;

wherein said network element concurrently utilizes the current operating software and current files residing in said active region of said processing element module during said downloading to said non-active region of said persistent storage module and installing of said new operating software in said non-active region of said processing element module and in said non-active region of said persistent storage module;

wherein the processing element module comprises a first central processing unit, a first physical storage unit for the active region, and a second physical storage unit for the non-active region, and the persistent storage module comprises a second central processing unit, a third physical storage unit for the active region, and a fourth physical storage unit for the non-active region; and wherein the active region of the processing element module and the active region of the persistent storage module are synchronized and access-locked, and the non-active region of the processing element module and the non-active region of the persistent storage module are not synchronized and not access-locked.

\* \* \* \* \*